United States Patent [19]
Henry

[11] Patent Number: 5,641,345
[45] Date of Patent: Jun. 24, 1997

[54] COMPOSITION AND METHOD FOR REFINISHING COMPACT DISKS

[75] Inventor: Daniel J. Henry, Fountain Valley, Calif.

[73] Assignee: James R. Black, Long Beach, Calif.; a part interest

[21] Appl. No.: 533,751

[22] Filed: Sep. 26, 1995

[51] Int. Cl.⁶ .............. B24D 3/02; B29C 59/00; C09C 1/68
[52] U.S. Cl. .............. 106/10; 106/3; 106/11
[58] Field of Search .............. 106/3, 11, 10; 252/DIG. 8; 51/305, 308

[56] References Cited

U.S. PATENT DOCUMENTS

| | | | |
|---|---|---|---|
| 1,884,767 | 10/1932 | Lougovoy | 252/163 |
| 1,901,728 | 3/1933 | Bradley | 106/3 |
| 1,999,165 | 4/1935 | Ellis | 87/5 |
| 2,207,967 | 7/1940 | Bland et al. | 252/163 |
| 2,214,263 | 9/1940 | Weihe, Jr. | 106/3 |
| 2,295,132 | 9/1942 | Sharp et al. | 106/3 |
| 4,218,250 | 8/1980 | Kasprzak | 106/3 |
| 4,883,502 | 11/1989 | Miyazaki et al. | 106/3 |
| 4,915,710 | 4/1990 | Miyazaki et al. | 106/3 |
| 4,935,039 | 6/1990 | Miyazaki et al. | 106/3 |
| 5,017,222 | 5/1991 | Cifuentes et al. | 106/16 |
| 5,094,687 | 3/1992 | Elepano | 106/10 |
| 5,334,335 | 8/1994 | Norville | 51/308 |

*Primary Examiner*—Melissa Bonner
*Attorney, Agent, or Firm*—Pretty, Schroeder & Poplawski

[57] ABSTRACT

Disclosed is a polishing composition for refinishing a plastic surface of a compact disk. The composition is made of (a) from about 15 to about 25 weight percent of a solvent for the plastic surface, (b) from about 12.5 to about 35 weight percent of an abrasive particulate, (c) from about 15 to about 35 weight percent of a petroleum distillate, (d) from about 2 to about 10 weight percent of a hard wax, and (e) from about 15 to about 25 weight percent water.

19 Claims, 1 Drawing Sheet

COMPOSITION AND METHOD FOR REFINISHING COMPACT DISKS

BACKGROUND OF THE INVENTION

1. Field of the Invention

This invention relates to the chemical arts. In particular, it relates to compositions useful as polishes for refinishing scratched surfaces.

2. Discussion of the Related Art

Compact disks have become increasingly popular in a wide variety of applications, because of their ability to digitally record large amounts of information. As shown in the figures, a typical compact disk contains three layers. The top layer 10 is a protective layer generally formed from an acrylic plastic film. The middle layer 12 is a reflective layer generally formed from aluminum or silver.

The bottom layer 14 is a substrate containing an optical surface. The optical surface has the digital information recorded on it in the form of a spiral track having sequences of minute pits. An optical read-out system is used to decode the information contained on the spiral track. If a laser beam passes through the bottom layer and over the surface of the track, the beam is reflected, caused to pass back through the bottom layer, and then caused to contact a photodiode, so that an electric signal is produced. In contrast, if the beam encounters a pit in the track's surface, it is not reflected and no signal is produced.

The bottom layer is made of a plastic material. Polycarbonate is the preferred plastic, because it is very strong and optically pure. A significant drawback to polycarbonate, however, is that the exterior surface of the polycarbonate layer is prone to scratching. If the exterior surface becomes too scratched, it can interfere with the passage of the laser beam through the substrate. When this happens, the optical read-out system will backtrack until it reads an unaffected sequence of pits and then continue. Often this leads to a "skip" or a constant "skipping", as the player gets stuck on one sequence and the compact disk stops playing.

Accordingly, there exists a definite need for a simple and effective method to remove scratches from and refinish the surface of a compact disk to prevent skipping. There has existed a further need for a polishing composition which can be applied to the surface of a compact disk to remove scratches and restore its optical quality. The present invention satisfies these and other needs and provides further related advantages.

SUMMARY OF THE INVENTION

The present invention is embodied in a polishing composition for refinishing the exterior plastic surface of a compact disk to restore its optical quality. The polishing composition is made of (a) from about 15 to about 25 weight percent, preferably about 17.5 to about 22.5 weight percent, of a solvent for the plastic surface, (b) from about 12.5 to about 35 weight percent, preferably from about 20 to about 35 weight percent, of an abrasive particulate, (c) from about 15 to about 25 weight percent, preferably from about 17.5 to about 22.5 weight percent, of a petroleum distillate, (d) from about 2 to about 10 weight percent, preferably about 5 weight percent, of a hard wax and (e) from about 15 to about 25 weight percent, preferably from about 17.5 to about 22.5 weight percent water, where the weight percentages are based on the total weight of the polishing composition. In a preferred embodiment, the solvent is acetone, the abrasive particulate is aluminum oxide, and the wax is carnauba wax.

The compact disk is treated by applying the polishing composition to the exterior surface of the plastic substrate and rubbing the polishing composition with sufficient force to treat substantially all the scratches. Any remaining solvent is then allowed to evaporate and the residual polishing composition is removed to produce a refinished surface having restored optical properties.

DETAILED DESCRIPTION OF THE PREFERRED EMBODIMENTS

Figure 1:
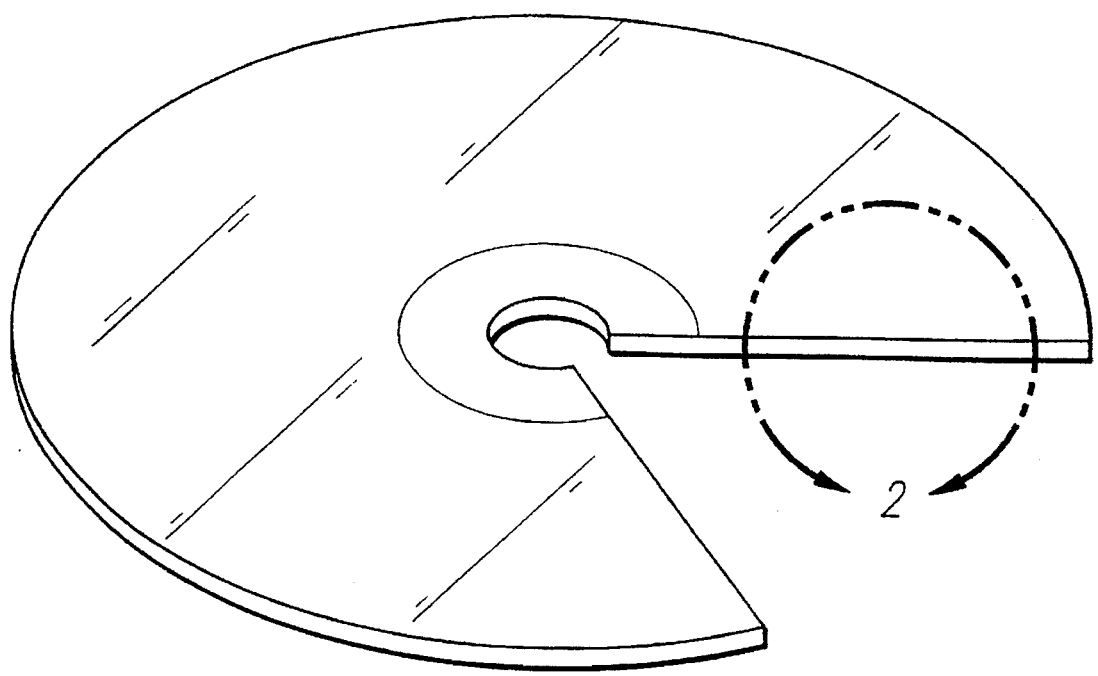
FIG. 1 is a perspective view, partially cut-away, of a prior art compact disk.
Figure 2:
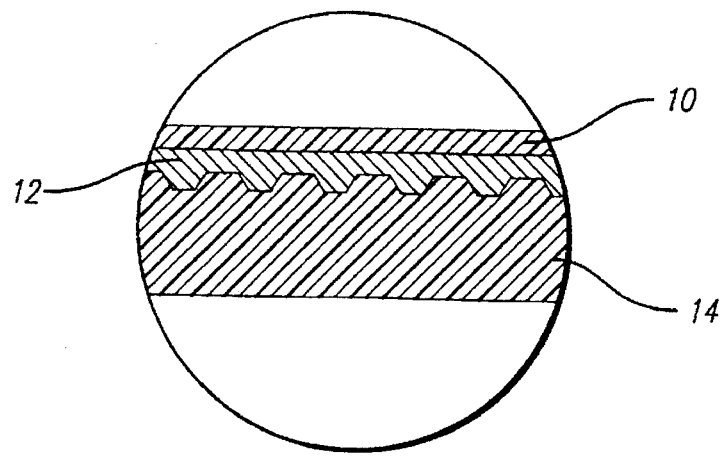
FIG. 2 is an enclosed, cross-section of a portion of the prior art compact disk shown in FIG. 1.

The polishing composition in accordance with the invention is useful in refinishing any compact disk having a plastic substrate with an optical surface. The plastic substrate is typically made of polycarbonate, because of its strength and optical purity. Such compact disks are well known in the art. Nonlimiting examples include audio disks, video disks and data disks, regardless of their actual dimensions.

The polishing composition contains (a) from about 15 to about 25 weight percent of a solvent for the plastic surface, (b) from about 12.5 to about 35 weight percent of an abrasive particulate, (c) from about 15 to about 25 weight percent of a petroleum distillate, (d) from about 2 to about 10 weight percent of a hard wax and (e) from about 15 to about 25 weight percent water, where the weight percentages are based on the total weight of the polishing composition.

The solvent is any solvent for the substrate layer. It is preferred that the solvent is volatile and evaporates within a period of from about five seconds to about one minute, preferably from about twenty seconds to about forty seconds. This volatility limits the action of the solvent on the plastic and facilitates the removal of the residual polishing compound once the compact disk has been treated. Examples of solvents include acetone, methylene chloride, methyl ethyl ketone, mesityl oxide, diacetyl alcohol and mixtures of the various solvents. Because acetone is inexpensive and non-toxic, as well as volatile and an effective solvent for polycarbonate, it is a preferred solvent.

Suitable particulates are mild abrasives. The composition must be sufficiently abrasive to treat scratches on the plastic surface. However, if the composition is too abrasive, the surface is further scratched instead of polished.

Representative abrasive materials include aluminum oxides, diatomaceous earths, aluminum silicates, pumice, Fuller's earth, bentonite, silicas, tripoli, hydrated calcium silicas, colloidal clay, magnesium oxides, red iron oxides, tin oxides and mixtures of these materials. The size of the particles is preferably from about 5 μ to about 600 grit, more preferably about 1000 to about 600 grit.

The petroleum distillate serves the dual functions of acting as a carrier for the abrasive particulates and as a solvent for the wax. Furthermore, it is believed that the petroleum distillate helps to clean and condition the plastic surface. Suitable petroleum distillates include Norpar 15 from Chevron.

The wax is a hard wax, i.e., a wax that has sufficient adhesion to surface and clarity of shine. Suitable waxes include carnauba wax, candelilla wax, japan wax, ceresin wax, synthetic waxes, and mixtures of the waxes. Carnauba wax is preferred. Water is added in an amount sufficient to provide a desirable consistency, i.e., a consistency that makes the polishing composition easily applicable to the surface of the compact disk.

Components (c)–(e) can be found in the appropriate ratios in conventional liquid car waxes, such as Turtle wax®. The composition of a typical car was is known in Table 1.

| | |
|---|---|
| Carnauba wax | 50 to 70 g. |
| Candelilla wax | 10 to 20 g. |
| Mineral spirits | 350 to 450 ml. |
| Water | 350 to 450 ml. |
| Diatomaceous earth | 15 to 30 g. |
| Silicone oil | 30 to 50 G. |
| Oleic acid | 15 to 25 g. |

Accordingly, the inventive polishing compositions can be made by admixing the appropriate amounts of components (a) and (b) to conventional liquid car wax formulations and the inventive polishing composition can optionally contain the additional ingredients, including silicone materials and organic acids, found in such formulations.

In a preferred composition, the solvent is acetone, present in an amount of from about 17.5 to about 22.5 weight percent, the abrasive is aluminum oxide, present in an amount of from about 20 to about 35 weight percent, the petroleum distillate is Norpar 15 present in an amount of from about 17.5 to about 22.5 weight percent, the wax is carnauba wax, present in an amount of about 5 weight percent, and the water is present in an amount of about 12.5 to about 22.5 weight percent, based on the total weight of the composition.

It is an advantage of the polishing compositions in accordance with the invention that they can be used to simply and effectively refinish scratched compact disk surfaces and prevent skipping when the disks are played. The polishing compositions are applied to the exterior surface of the plastic substrate using a non-abrasive applicator, such as a soft cloth or sponge.

The compositions are then rubbed onto the surface with sufficient force to treat substantially all the scratches. The disk is rubbed for a relatively short period of time, generally less than five minutes and, typically only two minutes or less. After rubbing, any remaining solvent is allowed to evaporate. Finally, the residual polishing composition is removed, for example, by buffing with a soft cloth.

The following examples is included to further illustrate the invention. It is not a limitation thereon.

EXAMPLE

A polishing composition in accordance with the invention was made by combining 47 parts by weight Turtle Wax® liquid with 33 parts by weight aluminum oxide having a particle size in the range of 600–1000 grit and 20 parts by weight acetone. Two drops of the polishing composition were applied to the surface of a compact disk that was so scratched it would not play without skipping. The composition was rubbed on the surface with a cotton cloth for one minute to refinish the surface and then removed. The compact disk could then be played without skipping.

Without wishing to be limited to a specific theory of operation, it is currently believed that the solvent for the plastic surface enhances the action of the abrasive particulates in removing a microlayer of the substrate and forming a smooth new exterior surface. In so doing, the scratches are eliminated or reduced in size. The petroleum distillate is believed to aid in cleaning the plastic surface and, together, with the solvent and the petroleum distillate condition the surface for the hard wax. The hard wax, in turn, is believed to fill in the remaining scratches and abrasions, and once buffed, restore the optical properties of the surface.

It will, of course, be understood that modifications to the presently preferred embodiments will be apparent to those skilled in the art. Consequently, the scope of the present invention should not be limited by the particular embodiments discussed above, but should be defined only by the appended claims which are intended to cover all reasonable equivalents and are to be interpreted as broadly as the prior art will permit.

I claim:

1. A composition for refinishing a compact disk having a plastic surface comprising:
   (a) from about 15 to about 25 weight percent of a solvent for the plastic surface;
   (b) from about 12.5 to about 35 weight percent of an abrasive particulate;
   (c) from about 15 to about 25 weight percent of a petroleum distillate;
   (d) from about 2 to about 10 weight percent of a hard wax; and
   (e) from about 15 to about 25 weight percent water, where the weight percentages are based on the total weight of the composition.

2. The composition of claim 1, wherein the solvent is selected from the group consisting of acetone, methylene chloride, mesityl oxide, diacetyl alcohol or mixtures thereof.

3. The composition of claim 1, wherein the solvent is a solvent for polycarbonate.

4. A composition for refinishing a compact disk having a plastic surface comprising:
   (a) from about 15 to about 25 weight percent acetone;
   (b) from about 12.5 to about 35 weight percent of an abrasive particulate;
   (c) from about 15 to about 25 weight percent of a petroleum distillate;
   (d) from about 2 to about 10 weight percent of a hard wax; and
   (e) from about 15 to about 25 weight percent water, where the weight percentages are based on the total weight of the composition.

5. The composition of claim 4, wherein the abrasive particulate has a particle size of from about 600 grit to about 5 μ.

6. The composition of claim 4, wherein the abrasive particulate has a particle size of from about 1000 to about 600 grit.

7. The composition of claim 6, wherein the abrasive particulate is selected from the group consisting of aluminum oxides, diatomaceous earths, aluminum silicates, pumice, Fuller's earth, silicates, tripoli, hydrated calcium silicates, colloidal clay, magnesium oxides, red iron oxides, tin oxides or mixtures thereof.

8. The composition of claim 6, wherein the abrasive particulate is an aluminum oxide.

9. The composition of claim 4, wherein the wax is selected from the group consisting of carnauba wax, candelilla wax, japan wax, ceresin wax, synthetic waxes, or mixtures thereof.

10. A composition for refinishing a compact disk having a plastic surface comprising:
    (a) from about 15 to about 25 weight percent of a solvent for the plastic surface;

(b) from about 12.5 to about 35 weight percent of an abrasive particulate;

(c) from about 15 to about 25 weight percent of a petroleum distillate;

(d) from about 2 to about 10 weight percent carnauba wax; and (e) from about 15 to about 25 weight percent water, where the weight percentages are based on the total weight of the composition.

11. The composition of claim 1, wherein the solvent is acetone, the abrasive is aluminum oxide, and the wax is carnauba wax.

12. The composition of claim 11, wherein the acetone is present in an amount of from about 17.5 to about 22.5 weight percent, the aluminum oxide is present in an amount of from about 20 to about 35 weight percent, the petroleum distillate is present in an amount of from about 17.5 to about 22.5 weight percent, the carnauba wax is present in an amount of about 5 weight percent and the water is present in an amount of from about 17.5 to about 22.5 weight percent.

13. The composition of claim 10, wherein the solvent is selected from the group consisting of acetone, methylene chloride, methyl ethyl ketone, mesityl oxide, diacetyl alcohol or mixtures thereof.

14. The composition of claim 10, wherein the solvent is a solvent for polycarbonate.

15. The composition of claim 14, wherein the solvent is acetone.

16. The composition of claim 10, wherein the abrasive particulate has a particle size of from about 600 grit to about 5 μ.

17. The composition of claim 10, wherein the abrasive particulate has a particle size of from about 1000 to about 600 grit.

18. The composition of claim 15, wherein the abrasive particulate is selected from the group consisting of aluminum oxides, diatomaceous earths, aluminum silicates, pumice, Fuller's earth, silicates, tripoli, hydrated calcium silicates, colloidal clay, magnesium oxides, red iron oxides, tin oxides or mixtures thereof.

19. The composition of claim 15, wherein the abrasive particulate is an aluminum oxide.

* * * * *